United States Patent Office 3,684,461
Patented Aug. 15, 1972

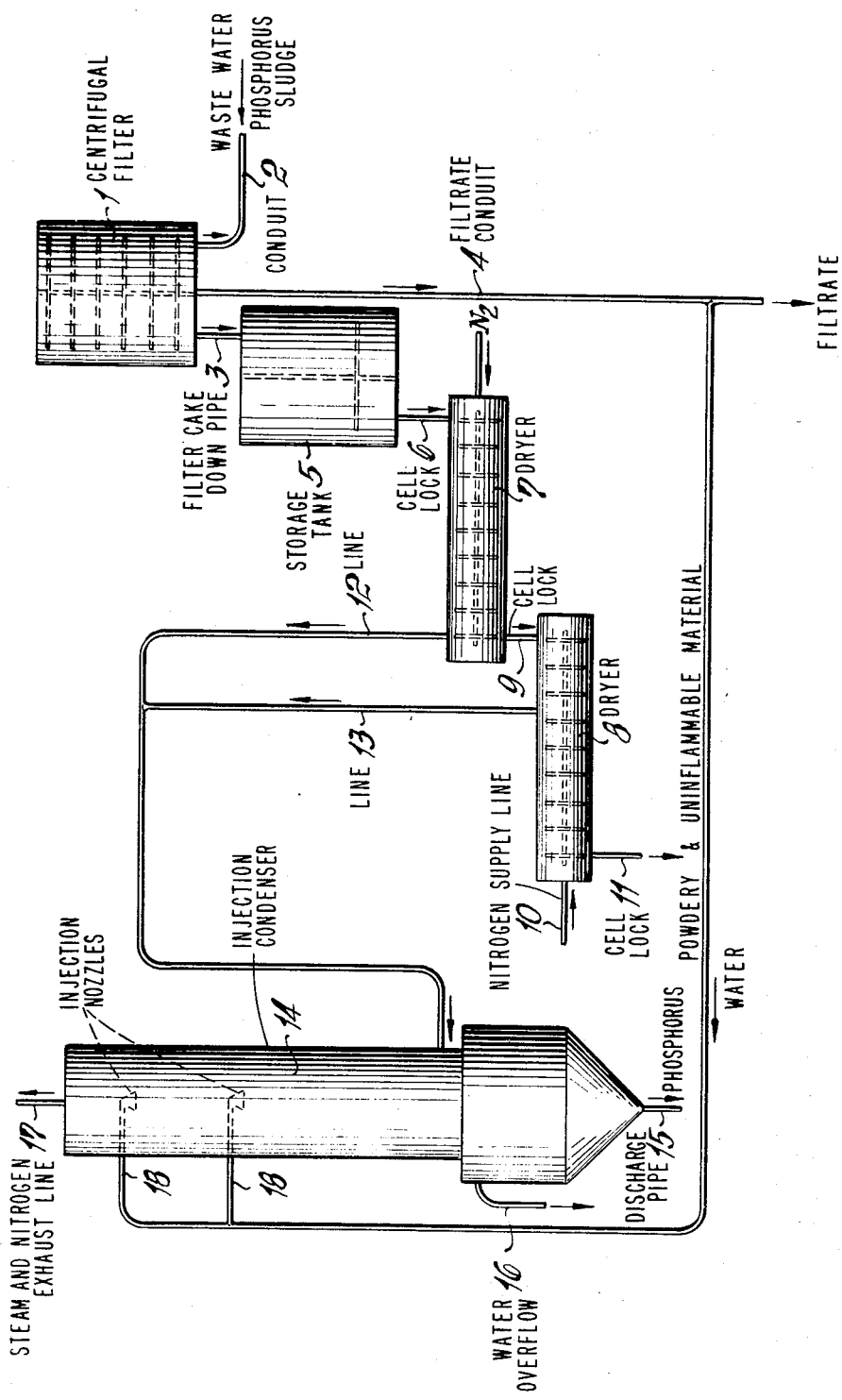

3,684,461
PROCESS AND APPARATUS FOR USE IN THE WORK-UP OF WASTE WATER CONTAINING PHOSPHORUS SLUDGE
Fritz Muller, 3 Am Grunen Weg, Knapsack, near Cologne, Germany; Karl-Heinz Stendenbach, 6a Am Hulderberg, Bruhl-Pingsdorf, Germany; and Horst-Heinrich Weizenkorn, 6 Uhlandstrasse, Efferen, near Cologne, Germany
Filed Nov. 12, 1969, Ser. No. 875,868
Claims priority, application Germany, Nov. 13, 1968, P 18 08 541.1
Int. Cl. C01b 25/00
U.S. Cl. 23—293 R
8 Claims

ABSTRACT OF THE DISCLOSURE

Process for the continual work-up of waste water having phosphorus sludge therein, such as that obtained in the electrothermal production of phosphorus. The waste water is first filtered in a filtration zone, the resulting filter cake is predried in a preliminary drying zone, the predried filter cake is conveyed through at least two additional drying zones maintained at temperatures between about 100 and 380° C., gaseous and vaporous matter issuing from said additional drying zones is delivered to a condensation zone, the phosphorus and water are condensed therein and separately removed therefrom.

The present invention relates to a process and an apparatus for use in the continual work-up of waste water having phosphorus sludge therein. This waste water is more particularly obtained in the electrothermal production of elemental phosphorus and its transformation into phosphorus products, for example upon phosphorus condensation from electric furnace gas, or in pressure tanks, wherein the phosphorus is burnt in contact with oxygen to $P_2O_5$, sometimes with immediate transformation of the $P_2O_5$ into orthophosphoric acid, in the presence of water.

Various processes for the work-up of such waste water have already been described.

One of these conventional processes comprises delivering the waste water to a centrifuge and separating phosphorus-containing sludge therein. Following this, the sludge is stored with agitation in a heated tank and forced later to travel from there under water pressure to a phosphorus reduction furnace. The waste water separated in the centrifuge, which still contains considerable proportions of phosphorus sludge, is subjected to separate finishing treatment. In the case of a high-capacity phosphorus reduction furnace, however, it is impossible to force sludge-containing waste water thereinto under pressure. The reason for this is that moist sludge results in the formation of more or less large-surfaced zones impermeable to gas, on the mixture of ores and fluxes in the furnace.

It has also been suggested that the sludge be distilled in a rotary kiln heated to a temperature of 700° C. In order to retain the flow properties of the sludge, it is necessary for it to be introduced thereinto jointly with crude phosphate, and the resulting material is delivered to a crude phosphate calcining furnace.

In this process, all of the water is required to be evaporated in the rotary kiln with heavy expenditure of energy, which is disadvantageous. In addition thereto, the crude phosphate also awaits heat treatment, and the large quantities of vaporous matter set free dictate the use of large dimensions for the rotary kiln, the pipe systems and the phosphorus and steam-condensation tower.

A further possibility comprises neutralizing the waste water by treatment with milk of lime and clarifying the whole in a thickener. Sludge, which is found to have deposited, is continually agitated to maintain it pumpable and delivered batchwise to a steam distillation stage. Matter issuing from the thickener through an overflow, which still contains some phosphorus, is treated with a bleaching liquor. The considerable proportions of water to be evaporated firstly limit the plant capacity and secondly dictate the use of considerable energy; it should be added that the individual apparatus parts have a rather limited distillation efficiency and that the process is carried out discontinuously, incidentally with considerable manual work.

It has also been suggested that a slide be used for the direct introduction of phosphorus-containing sludge into a phosphorus reduction furnace, but this again is a discontinuous operation not applicable to high-capacity furnaces, for reasons the same as those set forth above.

The present invention now unexpectedly provides a process, which enables the disadvantageous phenomena normally encountered in the work-up of phosphorus sludge-containing waste water to be avoided and which comprises first filtering the waste water in a filtration zone, then predrying the resulting filter cake in a preliminary drying zone, conveying the predried filter cake through at least two further or additional drying zones maintained at temperatures between about 100 and 380° C., delivering gaseous and vaporous matter issuing from the said additional drying zones to a condensation zone, condensing the phosphorus and water therein and removing them separately therefrom.

A reservoir zone or collecting tank should preferbaly be arranged ahead of the additional drying zones and the predrying step should preferably be carried out in the filtration zone.

The filtration zone, the preliminary drying zone, the additional drying zones, the condensation zone as well as the transition areas between the individual zones, more particularly however the additional drying zones, should preferably be arranged so as to exclude the access of outside air, and especially the additional drying zones should be maintained under inert gas, for example nitrogen.

The additional drying zones are preferably operated so as to first and predominantly expel steam in the first drying zone, at temperatures higher than 100° C., and then expel particularly phosphorus, for example in the second drying zone, at temperatures of up to substantially 380° C., for example about 350° C.

Auxiliary filter layers and /or filtration auxiliaries, for example, silicate slag, kieselguhr or coke dust, can be used in carrying out the filtration to facilitate the separation of sludge.

The waste water can be neutralized, preferably by the addition of calcium hydroxide, which may be added prior to or after filtration. The neutralization after filtration is preferred in those cases in which the waste water is used to effect condensation of vaporous matter expelled from the additional drying zones, in the condensation zone.

A further preferred feature of the present process comprises predrying the filter cake under elevated pressure up to substantially 6 atmospheres gauge pressure, effecting dust separation ahead of the condensation zone, and recycling the resulting dust to one of the preceding drying zones.

A still further advantageous feature of the present process comprises adding phosphorus sludge, such as that obtained during filtration of electrothermal yellow phosphorus, to the filter cake prior to drying it further.

The present invention also relates to an apparatus for use in the continual work-up of waste water having phosphorus sludge therein, the apparatus being substantially comprised of a centrifugal filter 1, a reservoir 5 having an agitator therein, at least two paddle blade screw driers 7 and 8 series connected thereto, and an injection condenser 14.

The process of the present invention offers the following advantages: It can be carried out in continuous and completely automatic fashion at high throughput rates for each of the individual apparatus structures without the need to use steam for heating the paddle blade screw driers, which are heated with low price waste gas issuing from phosphorus reduction furnaces. It also enables phosphorus sludge, such as that obtained by filtration of electrothermal elemental crude phosphorus, to be worked-up, even in those cases in which the sludge is found to contain considerable quantities of dust. As a result of this, the electric filters used for the purification of gas issuing from phosphorus reduction furnaces, have a longer service life, and smaller dimensions. In addition thereto, clear filtration water is obtained in the present process, which can be used in various ways for the electrothermal production of elemental phosphorus.

The process of the present invention will now be described with reference to the accompanying flow scheme.

Phosphorus sludge-containing waste water, obtained in the electrothermal production of phosphorus, is pumped through conduit 2 into filtration apparatus 1 and filtered therein. The resulting filter cake travels through down pipe 3 to be delivered to intermediary tank 5, which has a discharge means connected to it, and is conveyed then through a cell lock 6 to drier 7, wherein the bulk of the water contained in the filter cake is expelled together with a quantity of phosphorus, which corresponds to its vapor pressure at substantially 100° C. The residue, which is now anhydrous, travels through cell lock 9 to distilling apparatus 8 to be completely freed therein from phosphorus, at internal temperatures above the boiling point of yellow phosphorus. Powdery and uninflammable material is drawn off through cell lock 11.

Each of apparatus parts 7 and 8 is maintained under nitrogen travelling through line 10. The vaporous matter issuing from drier 7 and distillation apparatus 8, respectively, is delivered through lines 12 and 13 to injection condenser 14 and precipitated therein with the use of a portion of filtrate flowing through the conduit 4 for filtrate obtained near the centrifugal filter 1. Water from conduit 4 is supplied through nozzles 18. Nitrogen and steam escape near head of the condenser via line 17 and a water layer and a phosphorus layer deposit in the condenser's bottom portion. The phosphorus is drawn off at discharge line 15 and water overflows at line 16.

EXAMPLE 1

Filtration

Waste water having phosphorus slude therein and partially neutralized to have a pH-value of between 4 and 6 was filtered on a centrifugal filter with a filter surface area of 2.9 square meters. The net filtration period was 30 minutes per experiment.

(a) In the presence of kieselguhr as a filtration auxiliary

Preliminary suspension in waste water: 3 kg. kieselguhr
Continuous addition during filtration: 2 kg. kieselguhr
Quantity of waste water filtered: 2500 liters
Quantity of sludge centrifuged: 11 kg. earthy
P-content of filtrate: 1 mg./liter (b) In the presence of silicate slag as a filtration auxiliary Preliminary suspension in waste water: 8 kg. silicate slag
Continuous addition during filtration: 3 kg. silicate slag
Quantity of waste water filtered: 2700 liters
Quantity of sludge centrifuged: 19 kg., smeary
P-content of filtrate: <1 mg./liter.

EXAMPLE 2

Drying/distillation

The drying step was carried out in a paddle blade screw drier with circulation of hot oil (350° C.); the distillation was effected in an analogous apparatus under identical outdoor conditions. The temperature prevailing inside the drying zone was found not to exceed 100° C. but to increase to more than 300° C. between the inlet and outlet of the distillation zone.

(a) Use of sludge filtered as described under (1a) above

Quantity of sludge used: 11 kg.
After drying: 2.9 kg. (contains elemental phosphorus)
After distillation: 2.1 kg. (free from elemental phosphorus)

The residue was analyzed and found to be composed of:

| | Percent |
|---|---|
| $P_2O_5$ | 29.1 |
| CaO | 15.2 |
| $SiO_2$ | 40.8 |
| F | 3.7 |
| C | 8.2 |

Balance: not determined (b) Use of sludge filtered as described under (1b) above.

Quantity of sludge used: 19 kg.
After drying: 4.4 kg. (contains elemental phosphorus)
After distillation: 3.3 kg. (free from elemental phosphorus)

The residue was analyzed and found to be composed of:

| | Percent |
|---|---|
| $P_2O_5$ | 27.6 |
| CaO | 34.6 |
| $SiO_2$ | 21.2 |
| F | 3.4 |
| C | 7.2 |

Balance: not determined

We claim:

1. Process for recovering phosphorus from phosphorus sludge-containing waste water obtained in the electrothermal production of phosphorus, which comprises recovering the phosphorus continuously by the steps consisting of first filtering the waste water in a filtration zone to form a phosphorus-containing filter cake and then centrifuging off the resulting filter cake from the surface of the filtration zone; predrying the filter cake in a preliminary drying zone; conveying the filter cake coming from the said preliminary drying zone through at least two further drying zones maintained at temperatures of between about 100 and 380° C.; delivering to a condensation zone gaseous and vaporous matter issuing from the said further drying zones; condensing the said gaseous and vaporous matter in the said condensation zone and separately eliminating phosphorus and water therefrom by treatment with at least a portion of filtrate coming from the said filtration zone; removing residue free from elementary phosphorus from the last drying zone, all of these steps being carried out with the exclusion of air.

2. The process of claim 1, wherein a reservoir zone is placed ahead of the said additional drying zones.

3. The process of claim 1, wherein the predrying step is effected in the filtration zone.

4. The process of claim 1, wherein the additional drying zones are operated so as to first and predominantly expel steam in the first drying zone, at temperatures higher than 100° C., and then expel phosphorus in a further drying zone, at temperatures of up to substantially 380° C.

5. The process of claim 1, wherein the waste water is neutralized prior to filtering it.

6. The process of claim 1, wherein the filter cake is predried under elevated pressure up to substantially 6 atmospheres gauge pressure.

7. The process of claim 1, wherein the filtrate is neutralized and used then to effect condensation of the vaporous matter expelled from the additional drying zones, in the condensation zone.

8. Apparatus for recovering phosphorus from phosphorus-containing waste water, the apparatus comprising a centrifugal filter, an agitator reservoir, at least two paddle blade screw driers, an injection condenser, a plurality of conduits to include a filtrate delivery conduit from the filter to the condenser, a waste water supply conduit, and a filter cake outlet conduit connecting the said centrifugal filter to the said agitator vessel; wherein the said agitator vessel is fitted with a pipeline connecting it to the said paddle blade, screw driers, which are arranged separately from one another and series-connected together; wherein the said paddle blade screw driers carry waste gas outlet conduits and projecting into the said injection condenser; and wherein the said injection condenser is fitted with an upper waste gas discharge conduit, a lower phosphorus discharge valve and with a water overflow valve, which is positioned above the said lower phosphorus discharge conduit.

References Cited

UNITED STATES PATENTS

| | | | |
|---|---|---|---|
| 2,267,077 | 12/1941 | Buche | 23—223 |
| 2,289,277 | 7/1942 | Retter | 23—223 |
| 2,925,326 | 2/1960 | Pieper | 23—223 |
| 3,004,834 | 10/1961 | Harnisch | 23—293 |
| 3,104,952 | 9/1963 | Hartig | 23—293 |
| 3,136,604 | 6/1964 | Barker et al. | 23—293 |

OTHER REFERENCES

"Electric Furnace Proceedings" vol. 21, Lederman pp. 257–261 and p. 267, 1963.

NORMAN YUDKOFF, Primary Examiner

S. SILVERBERG, Assistant Examiner

U.S. Cl. X.R.

23—223